C. GARVER.
Horse Rake.
No. 22,232.
Patented Dec. 7, 1858.
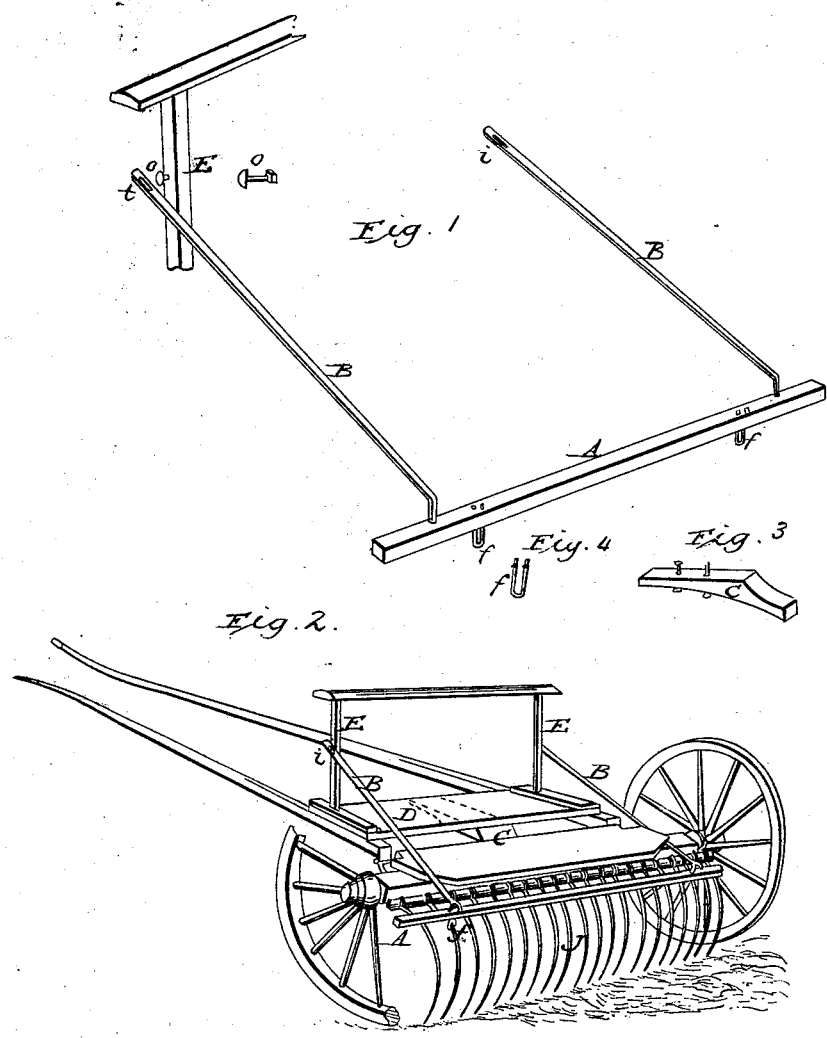

UNITED STATES PATENT OFFICE.

CHRISTIAN GARVER, OF LONDONDERRY TOWNSHIP, DAUPHIN COUNTY, PA.

IMPROVEMENT IN HORSE-RAKES.

Specification forming part of Letters Patent No. 22,232, dated December 7, 1858.

*To all whom it may concern:*

Be it known that I, CHRISTIAN GARVER, of Londonderry township, Dauphin county, and State of Pennsylvania, have invented certain new and useful Improvements in Horse Hay-Rakes; and I do hereby declare that the following is a full, clear, and exact description of the same, reference being had to the accompanying drawings, and to the letters of reference marked thereon.

The nature of my invention or improvement consists in the arrangement of a cross-piece or cleaner, A, Figure 1, having two parallel arms or stays, B B, bent at their insertion or attachment to cross-piece A at the one end and having oblong holes or openings (marked $i$) at the other end. These oblong holes are for the purpose of affording the requisite play in the headed pins $o$, which keeps them in place while the rake is being raised in emptying. These pins $o$ are firmly fixed in the uprights E E, the application of which is shown in Fig. 2, which is a representation of the aforesaid rake thus improved.

To the under side of the cross-piece A, near each end, I affix a staple, $f$, so as to loosely embrace one of the curved teeth of the said rake, said cross-piece being lodged on all the teeth near their attachment and kept in place by the parallel arms B, hinged on the upright E by means of the headed pins $o$ and slot $i$, the operation of which is that when the teeth are elevated to dislodge the contents of the rake they will move from heel to point under the cross-piece A, and all clogging thereby prevented. I also use a stay-block, $c$, Fig. 3, attached to the under side of the foot-board D, so as to project, curved downward, in close proximity with the under edge of the axle of the wheels, in order to guard against the possibility of the rake being turned inward under the vehicle.

Having thus fully described my improvement, what I claim as new, and desire to secure by Letters Patent, is—

The arrangement of the cross-piece A, staples $f$, parallel arms B, slots $i$, and pins $o$, with rake J, in the manner and for the purpose herein specified.

CHRISTIAN GARVER.

Witnesses:
S. C. BRINSER,
JOHN M. KEIPER.